United States Patent
Chambonneau et al.

(10) Patent No.: US 9,267,586 B2
(45) Date of Patent: Feb. 23, 2016

(54) TRANSMISSION ELEMENT

(71) Applicants: Charles Chambonneau, Joué lès Tours (FR); Benoit Hauvespre, Saint Etienne de Chigny (FR)

(72) Inventors: Charles Chambonneau, Joué lès Tours (FR); Benoit Hauvespre, Saint Etienne de Chigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/469,779

(22) Filed: Aug. 27, 2014

(65) Prior Publication Data

US 2015/0059520 A1 Mar. 5, 2015

(30) Foreign Application Priority Data

Aug. 27, 2013 (FR) ...................... 13 58211

(51) Int. Cl.
| | |
|---|---|
| *F16H 53/06* | (2006.01) |
| *F01L 1/16* | (2006.01) |
| *F16H 25/14* | (2006.01) |
| *F04B 1/04* | (2006.01) |
| *F04B 9/04* | (2006.01) |

(52) U.S. Cl.
CPC .............. *F16H 25/14* (2013.01); *F04B 1/0426* (2013.01); *F04B 9/042* (2013.01); *F16H 53/06* (2013.01); *Y10T 74/2107* (2015.01)

(58) Field of Classification Search
CPC ............ F16H 53/06; F16F 15/34; F01L 1/16; F01L 2101/00
USPC ................... 74/10.29, 10.6, 567, 569, 570.1; 123/90.48, 90.49, 90.5, 90.51; 29/888.4; 92/129
See application file for complete search history.

(56) References Cited

U.S. PATENT DOCUMENTS

| | | | | |
|---|---|---|---|---|
| 5,931,133 | A * | 8/1999 | Giannone et al. | 123/90.5 |
| 7,793,583 | B2 * | 9/2010 | Radinger et al. | 92/129 |
| 2006/0078243 | A1 * | 4/2006 | Ochi et al. | 384/449 |
| 2011/0132304 | A1 * | 6/2011 | Katayama et al. | 123/90.44 |
| 2014/0033858 | A1 * | 2/2014 | Park | 74/569 |

FOREIGN PATENT DOCUMENTS

| | | |
|---|---|---|
| DE | 6911539 U | 8/1969 |
| DE | 102008057222 A1 | 5/2010 |
| EP | 1731778 A2 | 12/2006 |
| FR | 2831623 A1 | 5/2003 |

* cited by examiner

*Primary Examiner* — Adam D Rogers
(74) *Attorney, Agent, or Firm* — Bryan Peckjian; SKF USA Inc. Patent Dept.

(57) ABSTRACT

A transmission element according to the invention for an actuating system integrated into an internal combustion engine provides a cam follower including a roller articulated on a shaft mounted on a piston suitable for sliding in a bore formed in a body of the transmission element is provided. The shaft having a body extending around a longitudinal axis, and includes at least one sacrificial tip attached on one of the ends of the body of the shaft. The sacrificial tip is made from a material having a hardness below the hardness of the material of the body defining the bore.

10 Claims, 3 Drawing Sheets

TRANSMISSION ELEMENT

CROSS-REFERENCE TO RELATED APPLICATIONS

This application claims priority to French Patent Application No. 1358211 filed Aug. 27, 2013, which is herein fully incorporated by reference.

FIELD OF THE INVENTION

The invention relates to a transmission element integrated into an internal combustion engine.

BACKGROUND OF THE INVENTION

In the field of hydraulic, oil or gasoline pumps for internal combustion engines, pistons are generally actuated using rotating camshafts, the cams of which cooperate with cam followers. The cam followers generally comprise a roller articulated on a shaft mounted on the piston, which is suitable for sliding in a bore with which the cam follower forms a transmission element. The bore may be a chamber of a pump body. The shaft on which the roller is articulated is freely translatable along its longitudinal axis and is capable of coming into contact, or not coming into contact, with a wall of the bore in which the piston is mounted.

To avoid deterioration of the ends of the shaft or the surface of the bore, it is known from U.S. Pat. No. 7,793,583 to provide the ends of the shaft with curved surfaces suitable for coming into contact with the bore. Such a solution involves high friction and rapid wear of the bore.

It is known to stop the shaft axially relative to the piston, for example using elastic rings. It is also known to apply a coating on the ends of the shaft, in order to dampen the impact that may occur between the ends of the shaft and the bore. The production of a coating or placement of elastic rings requires additional production steps and creates a significant excess cost.

The invention aims to resolve these drawbacks by proposing a new transmission element whereof the cam follower has a structure allowing the damping of any impacts between the ends of the shaft and the bore more reliably and cost-effectively than in the state of the art.

To that end, the invention relates to a transmission element for an actuating system integrated into an internal combustion engine comprising a cam follower including a roller articulated on the shaft mounted on a piston suitable for sliding in a bore formed in a body of the transmission element, the shaft comprising a body extending around a longitudinal axis. This transmission element is characterized in that the shaft comprises at least one sacrificial tip attached on one of the ends of the body of the shaft and in that the sacrificial tip is made from a material having a hardness below the hardness of the material of the body defining the bore.

Owing to the invention, the potential friction between the ends of the shaft and the bore is damped by the sacrificial tips, which may deteriorate in contact with the bore without causing a failure on the cam follower. Furthermore, their hardness below that of the body defining the bore makes it possible to avoid damage on the surface of the bore.

SUMMARY OF THE INVENTION

According to advantageous, but optional aspects of the invention, such a transmission element may incorporate one or more of the following features, in any technically allowable combination:

The sacrificial tip is made from a metallic material.

The sacrificial tip is made from a synthetic material and made by injection molding.

The sacrificial tip is secured to the body of the shaft by forcible mounting or gluing.

The sacrificial tip is mounted removably relative to the body.

At least one of the sacrificial tips is freely rotating relative to the body of the shaft along the longitudinal axis of the shaft.

A sacrificial tip is attached on each of the ends of the body of the shaft, while the two sacrificial tips are made on two separate parts.

A sacrificial tip is attached on each of the ends of the body of the shaft, while the two sacrificial tips are made in a single piece extending inside the body of the shaft.

The sacrificial tip has a convex outer shape, preferably spherical.

The body of the shaft is hollow, while the sacrificial tip comprises a central stem extending in the hollow part of the body of the shaft.

BRIEF DESCRIPTION OF THE DRAWINGS

The invention will be better understood, and other advantages thereof will appear more clearly, in light of the following description of two embodiments of a transmission element according to its principle, done as a non-limiting example and in reference to the appended drawings, in which.

DETAILED DESCRIPTION OF THE INVENTION

Figure 1:
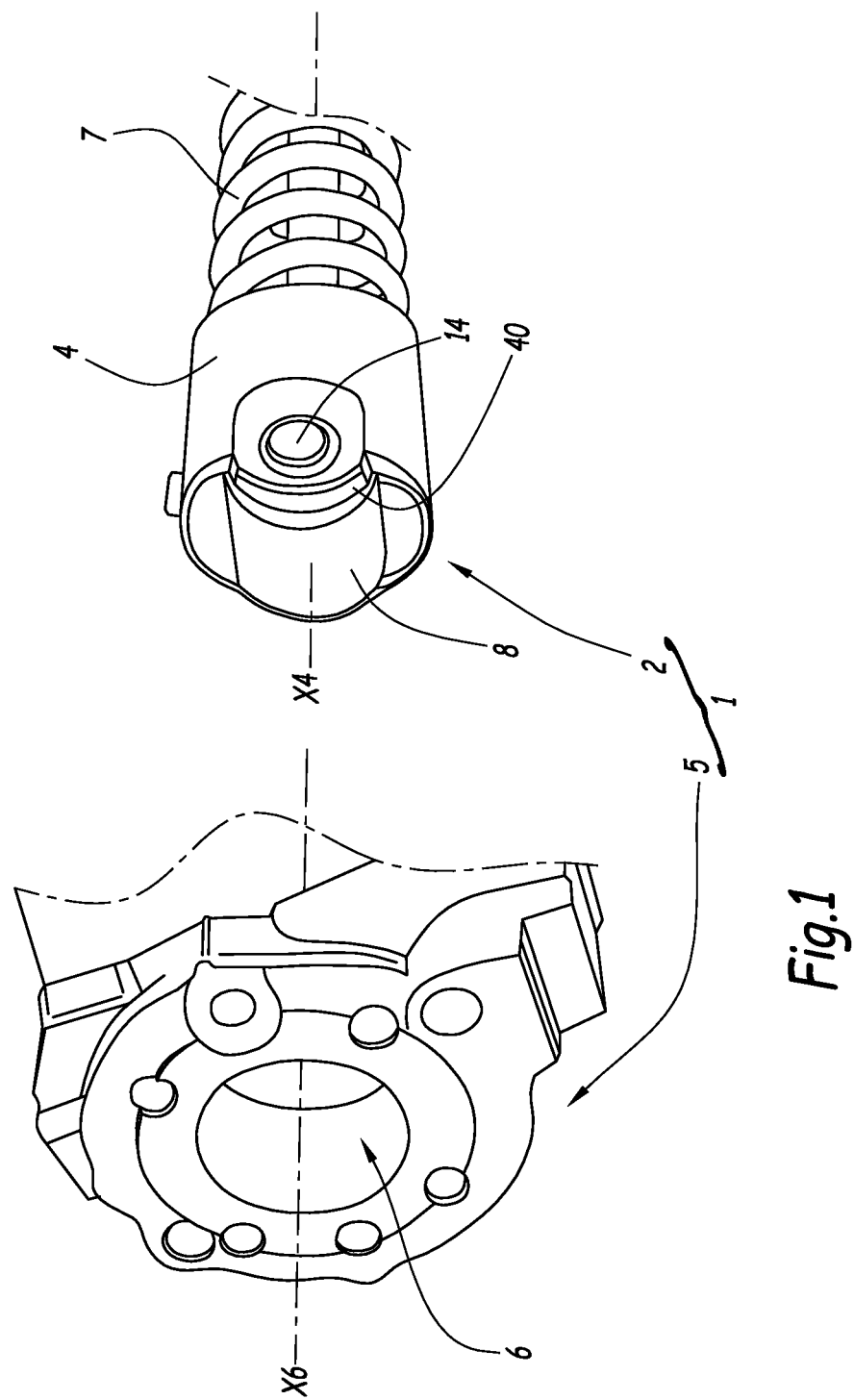
FIG. 1 is a perspective view of a transmission element according to the invention, a cam follower and a pump body belonging to the transmission element being in the disassembled configuration.
Figure 2:
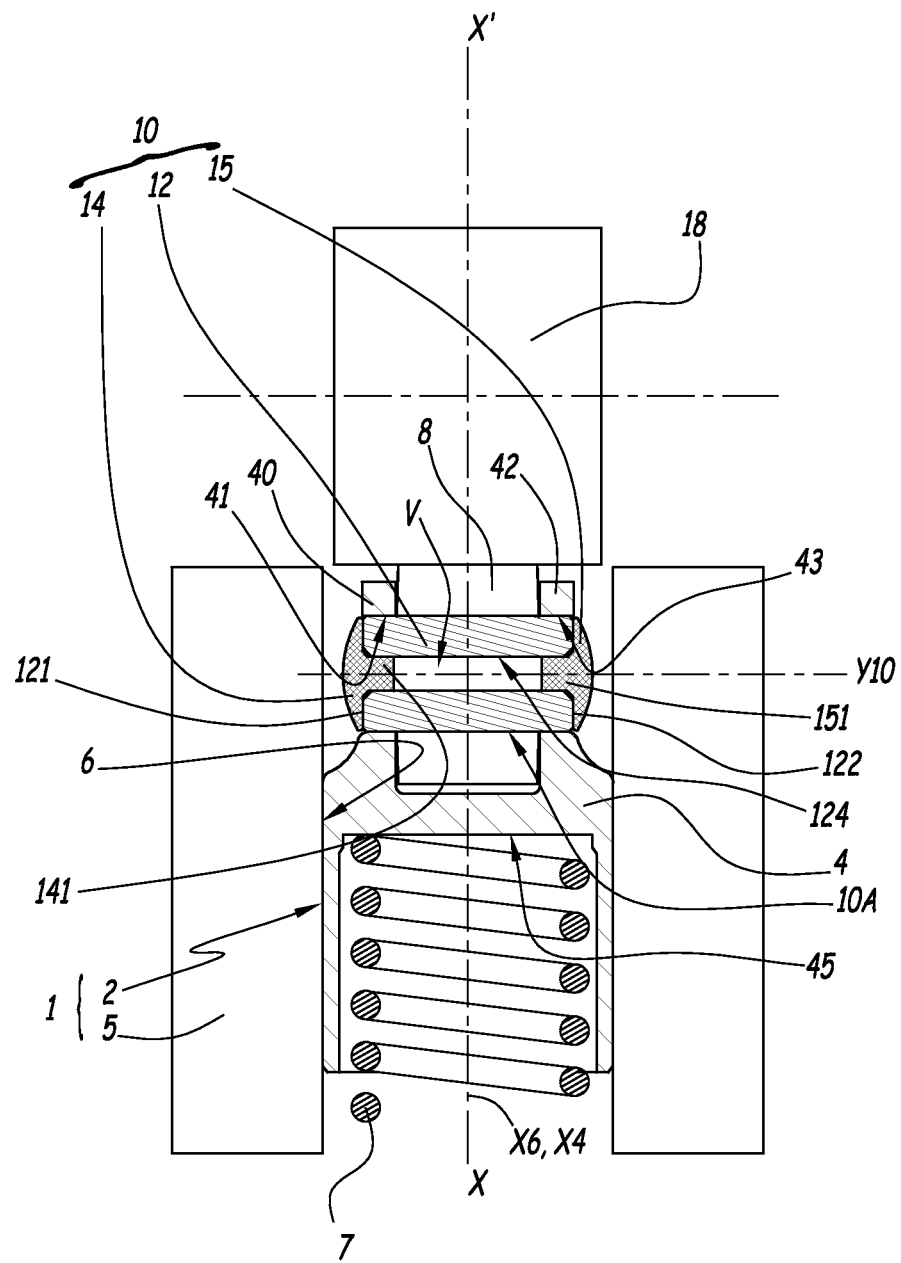
FIG. 2 is a longitudinal cross-sectional view of the transmission element of FIG. 1, in the operating configuration.
Figure 3:
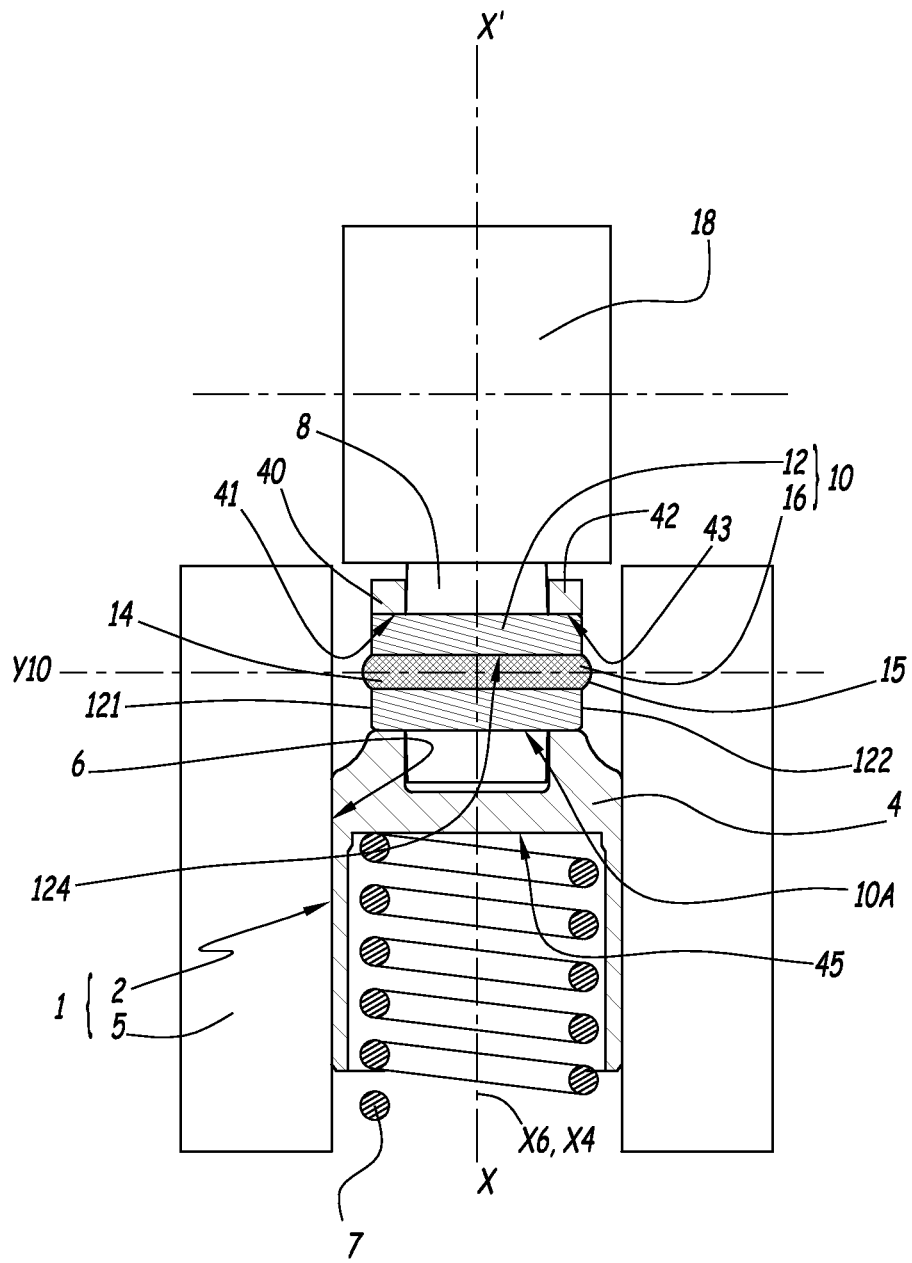
FIG. 3 is a view similar to FIG. 2, for a transmission element according to a second embodiment of the invention.

The cam follower 2 shown in FIGS. 1 to 3 comprises a piston 4 suitable for sliding along an axis X-X' in a bore 6 formed in a pump body 5. The bore 6 extends along a longitudinal axis X6. The pump body 5 may be part of an actuating system integrated into an internal combustion engine, such as a hydraulic, oil or gasoline pump.

The cam follower comprises a roller 8 articulated on the shaft 10. The roller 8 is kept in contact with a cam 18, only visible in FIG. 2, by a spring 7, housed in the bore 6, which bears on an axial surface 45 of the piston 4. The cam follower 2 and the pump body 5 together form a transmission element 1 for transmitting a movement between the cam 18 and the piston 4. The axial surface 45 is perpendicular to a longitudinal axis X4 of the piston 4. When the piston 4 is mounted in the bore 6, the axes X4, X6 and X-X' are combined.

The piston 4 includes two lugs 40 and 42 substantially parallel to the axis X4. The lugs 40 and 42 respectively include a circular hole 41 and 43, the shaft 10 being mounted through the holes 41 and 43. The lugs 40 and 42 extend on either side of the axis X4.

The shaft 10 comprises a body 12 extending around the longitudinal axis Y10 that also forms the axis of rotation of the roller 8 around the shaft 10. The shaft Y10 is perpendicular to the axis X-X'. The shaft 10 is mounted freely translating and rotating, along the axis Y10, in the holes 41 and 43.

The body 12 has two opposite ends 121 and 122 along the axis Y10 and situated across from the wall of the bore 6. In order, during operation of the cam follower 2, for the shaft 10 and the bore 6 not be deteriorated by friction or impact in case of translation of the shaft 10 along the axis Y10, the shaft 10 comprises, at each of the ends 121 and 122 of the body 12, a sacrificial tip 14 and 15 attached on the body 12 and made from a material whereof the hardness is lower than that of the material of the body 5 in its part that defines the bore 6. The term "sacrificial" reflects the fact that the tips do not perform an essential technical function in the operation of the cam follower 2, and the potential deterioration is not detrimental and makes it possible to protect other elements of the cam follower 2. The tips 14 and 15 are typically made from a synthetic material and made by injection molding. Preferably, the synthetic material is from the PEAK family, and may or may not be reinforced with glass fibers.

Alternatively, the tips 14 and 15 may also be made from a metallic material such as a copper alloy, for example bronze, or an aluminum alloy.

The pump body 5 is preferably made from a metallic material, for example aluminum alloy ($AlSi_{12}CuNiMgT_6$ or other), or foundry (GGG-40 according to DIN, or other).

In the event the surfaces of the tips 14 and 15 and those of the pump body 5 designed to be in contact with each other are of the same type, i.e., they are all made up of either synthetic materials or metal materials, the term "lower hardness" means that the hardness of the material of the tips 14 and 15 has a value comprised between 20% and 60%, preferably equal to 40%, of the value of the hardness of the material of the body 5. In the case of synthetic materials, the unit of measure of the hardnesses is the Shore, while in the case of metallic materials, the unit of measure of the hardnesses is Vickers or Rockwell.

The body 12 is hollow and includes an inner channel 124 emerging at each of the ends 121 and 122. The tips 14 and 15 each include a central stem 141 and 151 extending along the axis Y10 in the inner channel 124.

The tips 14 and 15 are preferably mounted removably in the body 12. In this way, if, during a predetermined operating period of the cam follower 2, the tips 14 and 15 have been worn down by friction against the bore 6, they can be replaced by new tips 14 and 15 in order to extend the lifetime of the shaft 10.

Alternatively, the tips 14 and 15 may be reversibly secured to the body 12, for example by forcible mounting, gluing, or any other suitable technique.

The tips 14 and 15 preferably have a convex outer shape, for example a spherical shape. The tips 14 and 15 preferably extend over the entire surface of the ends 121 and 122 of the body 12, such that the tips 14 and 15 extend radially as far as a peripheral outer surface 10A of the shaft 10.

The tips 14 and 15 may be mounted freely rotating relative to the body 12 along the axis Y10. Alternatively, only one of the tips 14 and 15 may be freely rotating relative to the body 12.

The tips 14 and 15 are made on two separate parts each mounted at one of the ends 121 and 122 of the body 12. The stems 141 and 151 are separated by an empty space V situated at the center of the inner channel 124. This for example makes it possible to replace only one of the tips 14 and 15 if it is worn and to keep the other in place, if it is in suitable condition.

A second embodiment of the invention is shown in FIG. 3. In this embodiment, the elements shared with the first embodiment bear the same references and operate in the same way. Only the differences with respect to the first embodiment are described below.

In this embodiment, the tips 14 and 15 are made by a single part 16 extending in the inner channel 124. In that case, the part 16 has a cylindrical shape with a circular section centered on the axis Y10. The tips 14 and 15 do not extend as far as the peripheral surface 10A.

According to one embodiment that is not shown, only one of the ends 121 and 122 of the shaft 12 comprises an attached tip made from a material having a hardness lower than the hardness of the material of the body 5.

The features of the embodiments described above may be combined in the context of the present invention.

The invention claimed is:

1. A transmission element for an actuating system integrated into an internal combustion engine comprising:
    a cam follower including a roller articulated on a shaft mounted on a piston suitable for sliding in a bore formed in a body of the transmission element, the shaft having a body extending around a longitudinal axis, the shaft being moveable relative to the piston in an axial direction along the longitudinal axis, wherein
    the shaft includes at least one sacrificial tip attached to one of the end portions of the body of the shaft and the at least one sacrificial tip is made from a material having a hardness below the hardness of the material of the body defining the bore, the at least one sacrificial tip only being secured to the body of the shaft such that the at least one sacrificial tip moves in unison with the shaft when the shaft moves axially relative to the piston.

2. The transmission element according to claim 1, characterized in that the at least one sacrificial tip is made from a metallic material.

3. The transmission element according to claim 1, wherein the at least one sacrificial tip is made from a synthetic material and made by injection molding.

4. The transmission element according to claim 1, wherein the at least one sacrificial tip is secured to the body of the shaft by forcible mounting or gluing.

5. The transmission element according to claim 1, wherein the at least one sacrificial tip is mounted removably relative to the body.

6. The transmission element according to claim 1, wherein the at least one sacrificial tip rotates relative to the body of the shaft along the longitudinal axis of the shaft.

7. The transmission element according to claim 1, wherein the at least one sacrificial tip comprises a sacrificial tip attached on each of the end portions of the body of the shaft, and wherein the two sacrificial tips are made on two separate parts.

8. The transmission element according to claim 1, wherein the at least one sacrificial tip is comprised of a connecting member that extends through the body of the shaft and a sacrificial tip on each of the ends of the connecting member, and wherein the connecting member and the two sacrificial tips are formed as a unitary member.

9. The transmission element according to claim 1, wherein the at least one sacrificial tip has a convex outer shape.

10. The transmission element according to claim 1, wherein the body of the shaft is hollow, and the at least one sacrificial tip includes a central stem extending in the hollow part of the body of the shaft.

* * * * *